(12) United States Patent
Roy et al.

(10) Patent No.: US 10,313,528 B2
(45) Date of Patent: Jun. 4, 2019

(54) SYSTEMS, METHODS, AND COMPUTER PROGRAM PRODUCTS FOR PROVIDING REGIONAL SURVIVABLE CALLING OVER A PACKET NETWORK

(71) Applicant: Genband US LLC, Frisco, TX (US)

(72) Inventors: Paul Roy, Holly Springs, NC (US); Earl Barton Manchester, Lafayette, CO (US); Michael Kisselburgh, Argyle, TX (US); Julian Francispillai, Stittsville (CA); Danny Peeler, Apex, NC (US)

(73) Assignee: Genband US LLC, Frisco, TX (US)

( * ) Notice: Subject to any disclaimer, the term of this patent is extended or adjusted under 35 U.S.C. 154(b) by 336 days.

(21) Appl. No.: 14/226,530

(22) Filed: Mar. 26, 2014

(65) Prior Publication Data

US 2015/0281462 A1    Oct. 1, 2015

(51) Int. Cl.
*H04L 12/24*    (2006.01)
*H04L 29/06*    (2006.01)
(Continued)

(52) U.S. Cl.
CPC ...... *H04M 7/0057* (2013.01); *H04L 41/0659* (2013.01); *H04L 41/0668* (2013.01); *H04L 41/0893* (2013.01); *H04L 43/0811* (2013.01); *H04L 65/103* (2013.01); *H04L 65/1016* (2013.01); *H04L 65/1069* (2013.01)

(58) Field of Classification Search
CPC ......... H04L 45/28; H04L 45/00; H04L 45/22; H04L 69/40
See application file for complete search history.

(56) References Cited

U.S. PATENT DOCUMENTS 5,563,931 A * 10/1996 Bishop .................... H04W 4/90
455/404.1
6,563,919 B1 * 5/2003 Aravamudhan ...... H04L 12/589
370/401
(Continued)

FOREIGN PATENT DOCUMENTS

EP    2933952    1/2015

OTHER PUBLICATIONS

EPO, Application No. 15160892.4, Extended Search Report, dated Sep. 21, 2015, 6 pages.
(Continued)

*Primary Examiner* — Asad M Nawaz
*Assistant Examiner* — Berhanu D Belete
(74) *Attorney, Agent, or Firm* — Haynes and Boone, LLP

(57) ABSTRACT

A method is disclosed of providing survivable communications in a communications network, the method comprising: determining a loss of communications with a communications server, wherein the communications server provides calling features to an endpoint connected to the access node; and after determining a loss of communications with the communications server, forming a cluster of a plurality of access nodes to provide communication service to endpoints served by the plurality of access nodes, wherein the plurality of access nodes comprises the access node, and wherein the access node and a second access node in the plurality of access nodes use different access technology.

13 Claims, 10 Drawing Sheets

(51) Int. Cl.
  *H04M 7/00*  (2006.01)
  *H04L 12/26*  (2006.01)

(56) References Cited

U.S. PATENT DOCUMENTS

| | | | | |
|---|---|---|---|---|
| 7,961,849 B2* | 6/2011 | Sparks | H04M 7/0084 | 379/45 |
| 7,995,564 B1* | 8/2011 | Boudreaux | H04W 24/04 | 370/352 |
| 8,059,798 B1* | 11/2011 | Skubisz et al. | 379/112.02 | |
| 8,428,511 B1* | 4/2013 | Gunasekara | H04B 13/02 | 340/12.32 |
| 8,611,278 B2* | 12/2013 | Chen | H04B 1/74 | 370/328 |
| 2003/0061319 A1* | 3/2003 | Manzardo | H04L 67/14 | 709/221 |
| 2005/0083832 A1 | 4/2005 | Shimono | | |
| 2006/0098791 A1* | 5/2006 | Elder | H04M 3/24 | 379/37 |
| 2006/0120377 A1* | 6/2006 | Caballero-McCann | H04L 29/06027 | 370/395.2 |
| 2006/0209799 A1* | 9/2006 | Gallagher | H04W 88/04 | 370/352 |
| 2007/0005804 A1* | 1/2007 | Rideout | H04L 12/1822 | 709/246 |
| 2007/0071182 A1* | 3/2007 | Elder | H04M 11/04 | 379/45 |
| 2008/0002669 A1* | 1/2008 | O'Brien | H04L 12/66 | 370/352 |
| 2008/0037565 A1* | 2/2008 | Murray | H04M 3/5307 | 370/401 |
| 2008/0253381 A1* | 10/2008 | Ward | H04L 45/10 | 370/396 |
| 2009/0097478 A1* | 4/2009 | Didcock | H04L 12/5692 | 370/355 |
| 2009/0122791 A1* | 5/2009 | Ruetschi | H04L 12/66 | 370/352 |
| 2009/0262726 A1* | 10/2009 | Lord | | 370/352 |
| 2009/0279425 A1* | 11/2009 | Du | H04L 69/40 | 370/216 |
| 2011/0280118 A1 | 11/2011 | Maharana et al. | | |
| 2012/0113800 A1* | 5/2012 | Arsenault | H04K 3/222 | 370/220 |
| 2013/0343180 A1* | 12/2013 | Kini | H04L 45/22 | 370/228 |
| 2014/0317440 A1* | 10/2014 | Biermayr | H04L 41/0668 | 714/4.11 |

OTHER PUBLICATIONS

Extended Search Report, Application No. 15160892.4, dated Sep. 15, 2015, 6 pgs.

* cited by examiner

SYSTEMS, METHODS, AND COMPUTER PROGRAM PRODUCTS FOR PROVIDING REGIONAL SURVIVABLE CALLING OVER A PACKET NETWORK

TECHNICAL FIELD

The present description relates, in general, to providing regional survivable calling, and, more specifically, to clustering of nodes to provide calling services to endpoints after a primary services platform becomes unavailable.

BACKGROUND

In many modern communication architectures, a communications platform, such as a call server, an application server, a softswitch, and/or an interne protocol (IP) multimedia subsystem (IMS) solution provides communications services to communications endpoints over a packet network. In some instances, the communications platform provides basic connectivity between endpoints as well as more advanced features, such as caller identification, call forwarding, three-way calling, and call waiting, among others. Thus, connectivity with the communications platform is important in providing not only advanced features but also basic connectivity between endpoints.

A fault can occur in a communication network that disconnects the communications platform from various parts of the network, depending on the location of the fault. A fault can occur due a failure of a router or a physical link, as examples. A router or a physical link connected to the router may fail for any of a number of reasons. For example, a link may be severed, or any of a number of physical components on the router may fail due to normal wear and tear or due to an exceptional event, such as a power surge. Regardless of the reason for the fault, an endpoint may lose basic connectivity with other endpoints if connection with a communications platform is lost for any reason.

Emergency standalone (ESA) service refers to the ability to provide some limited calling services, such as 911 service, even if there is a failure in the network that causes a loss of connectivity to the communications platform and therefore a loss of connectivity to other endpoints and their users. Conventional approaches to providing ESA service focus on providing basic connectivity at the level of an access node that serves a group of endpoints. When an access node is disconnected from the communications platform, the access node itself can provide some basic connectivity to endpoints directly connected to the access node. Furthermore, conventional approaches also address grouping of access nodes, provided each of the access nodes connects endpoints using an access technology common to each of the access nodes. Grouping of access nodes can provide regional access between endpoints connected to the various access nodes. However, modern telecommunications networks can comprise access nodes that span a number of different access transport technologies and protocols, particularly with respect to upstream interfaces with a communications platform and/or downstream interfaces with one or more endpoints. For example, some networks include access nodes that provide various combinations of analog telephony, legacy digital telephony, and packet-based telephony, such as voice over Internet protocol (VoIP), through a broad range of protocols, including network-based call signaling (NCS), media gateway control protocol (MGCP), gateway control protocol (H.248), H.323 and session initiation protocol (SIP). In some embodiments, the transport technologies and communications interfaces and protocols may be collectively referred to as access technologies. The provision of regional survivable communications involving access nodes with disparate access technologies has not been addressed previously.

BRIEF DESCRIPTION OF THE DRAWINGS

The present disclosure is best understood from the following detailed description when read with the accompanying figures.

SUMMARY

Figure 1:
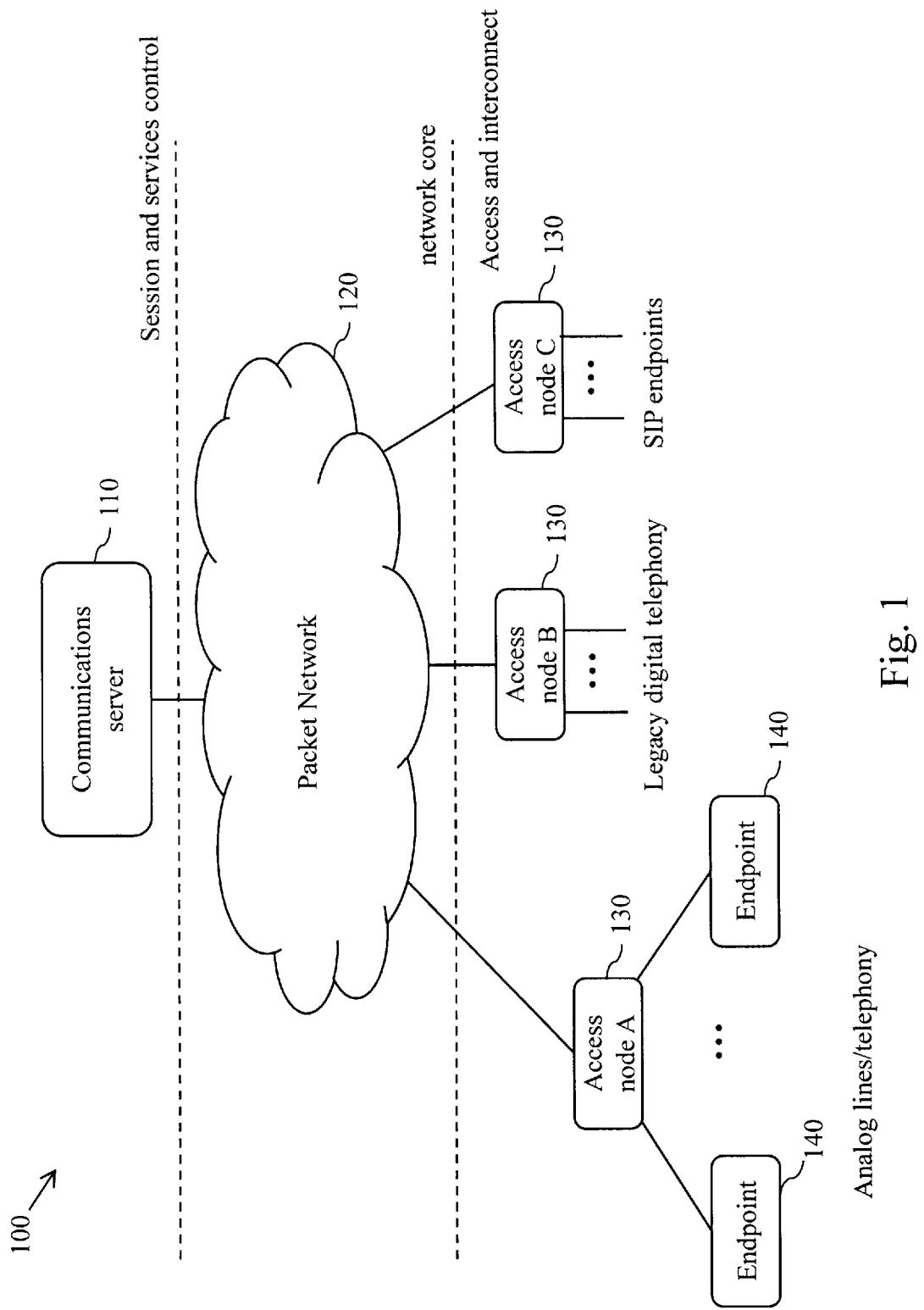
FIG. 1 illustrates an embodiment of an example network architecture.

According to one embodiment, a method is disclosed of providing survivable communications in a communications network using an access node, the method comprising: determining a loss of communications with a communications server, wherein the communications server provides call connectivity to an endpoint coupled to the access node; and after determining a loss of communications with the communications server, forming a cluster of a plurality of access nodes to provide communication service to endpoints served by the plurality of access nodes, wherein the plurality of access nodes comprises the access node, and wherein the access node and a second access node in the plurality of access nodes use different access technology.

According to another embodiment, a system is disclosed comprising: an access node configured to couple to an endpoint and a communications server. The access node comprises a communication circuitry configured to (a) receive a call request from an endpoint, wherein the call request comprises an identifier of a second endpoint, and (b) transmit a control message to a communications server, wherein the communications server is configured to provide calling features to the endpoint. The access node also comprises a processor configured to (a) determine that the access node is disconnected from the communications server, (b) determine that the second endpoint is not connected to the access node, and (c) instruct the communication circuitry contact a device in communication with the second endpoint, wherein the endpoint uses a first access technology, and wherein the second endpoint uses a second access technology different than the first access technology.

According to another embodiment, a computer program product is disclosed having a computer readable medium tangibly recording computer program logic for establishing a call between endpoints coupled to different access nodes when the access nodes lose communication with a session and services control layer, the computer program product comprising: code to determine that an access node is disconnected from the session and services control layer, wherein the session and services control layer provides calling features to an endpoint coupled to the access node; and code to provide communication service between the endpoint and a second endpoint connected to a second access node after the access node is disconnected from the session and services control layer, wherein calling features provided to the endpoint utilize a first access technology, and wherein the access node utilizes a first access technology, and wherein c the second access node utilizes a second access technology different than the first access technology.

The foregoing and other objects, features and advantages of the invention will become more readily apparent from the following detailed description which proceeds with reference to the accompanying drawings.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments disclosed herein include systems, methods, and computer program products for clustering of access nodes to provide regional survivable calling in architectures in which a connection to a central communications server or a session and services control layer is lost. By clustering access nodes, calling services can be provided between an endpoint coupled to an access node in the cluster and an endpoint coupled to any other access node in the cluster. A cluster of access nodes comprises a plurality of access nodes, each of which use any one of a number of access technologies. In some embodiments, one type of access node connects analog phone endpoints to a packet-based network, and another type of access node connects packet-based endpoints, such as session initiated protocol (SIP) endpoints, to a packet-based network. Thus, a cluster of access nodes can intermingle legacy media, such as analog phone endpoints, with more contemporary media, such as packet-based endpoints, to provide calling services over a larger geographical region than covered by a single access node.

FIG. 1 illustrates an embodiment of an example network architecture 100 in which the present approaches can be incorporated. The architecture 100 comprises a plurality of access nodes A through C 130 coupled to a communications server 110 via a packet network 120. In an embodiment, the packet network 120 uses internet protocol (IP), asynchronous transfer mode (ATM), or any other appropriate packet network protocol for transporting packets between access nodes 130 and communications server 110.

Each access node 130 is coupled to at least one endpoint 140. For illustrative purposes, endpoints 140 are shown for only one access node, access node A 130, but each access node 130 is typically coupled to at least one endpoint 140, either directly or via another access node. In this example, the network architecture 100 is capable of providing real-time communication, including not only voice but video-conferencing, and is also capable of providing other services such as text messaging. More specifically, access node A is connected to endpoints (e.g., telephones) via POTS analog lines, access node B 130 is connected to endpoints via digital telephone lines (e.g., lines complying with GR-303), and access node C 130 is connected to session initiated protocol (SIP) endpoints. Different types of access nodes 130 facilitate connection of different types of endpoints. In this example, for access node A, the endpoints 140 are legacy POTS phones or a legacy private branch exchange (PBX), and access node A 130 and the endpoints 140 communicate using legacy signals, such as analog, TDM, or primary rate interface (PRI) trunks, and for access node C 130, the endpoints 140 are contemporary packet-based endpoints, such as SIP endpoints. For example, an endpoint 140 can be a cable modem with a SIP client, in which case access node C 130 can be a session border controller. Possible endpoint devices include mobile wireless devices and fixed wireline or desktop devices, and the endpoint devices may be connected to an access node 130 accordingly (e.g., via a wireless network, via a public switched telephone network (PSTN), or via the internet).

In this example, the communications server 110 provides communications services. For example, the communications server 110 is configured to receive call requests from endpoints 140 and determine how to deliver the calls. In an embodiment, the communications server 110 is a call server, an application server, an IP multimedia subsystem (IMS) solution, and/or a softswitch. In one scenario, an endpoint 140 attempts to call another endpoint using a subscriber or endpoint identifier, such as a ten-digit telephone number or a SIP uniform resource identifier (URI). The communications server 110 receives a call request and the endpoint identifier and determines how to deliver the call. In an example, the communications server 110 offers enhanced calling features, such as caller identification (ID), call forwarding, three-way calling, and call waiting, among others, in addition to providing basic call connectivity between endpoints, regardless of the access technology used by an endpoint. In this example, the communications server 110 identifies an access point 130 to which an endpoint 140 associated with the endpoint identifier is attached and establishes communication with the identified endpoint 140. In conventional schemes, a connection to the communications server 110 is needed to provide communication services between endpoints 140 on access nodes 130 that use disparate access technologies, such as in the architecture illustrated in FIG. 1. An access node can be connected to an endpoint directly or via a network, such as a carrier or enterprise network, depending on the endpoint technology.

The network architecture 100 includes the following layers: (1) session and services control, (2) network core and (3) access/interconnect. During normal operation, the access and interconnect access nodes 130 (also sometimes referred to as network elements) provide access services to subscribers of network services and provide interconnect services for interworking with other communication networks. The access nodes 130 receive their session control and services control from a centralized session and services control layer, which may be provided by the communications server 110. This could be an IMS based network or a softswitch based network. The access nodes 130 can communicate with the services and session control function or layer through a broad range of communication protocols such as network-based call signaling (NCS), media gateway control protocol (MGCP), gateway control protocol (H.248), H.323 and SIP. Although illustrated as a communications server 110, the session and services control layer may be implemented by a group of servers that may more generally be referred to as a communications service.

When a communications session is originated from an endpoint, the communication session is controlled by session and services control functions that reside in the session and services control layer. Within this architecture, if an access or interconnect element is isolated from the session and services control layer, it can no longer provide communication services. The techniques described herein allow a broad range of endpoints and their associated subscribers served through this network architecture 100 to continue to receive communication services when the access or interconnect elements are isolated from the session and services control layer. The techniques described herein also allow these endpoints to participate in local, regional, and carrier interconnected communications communities.

Figure 2:
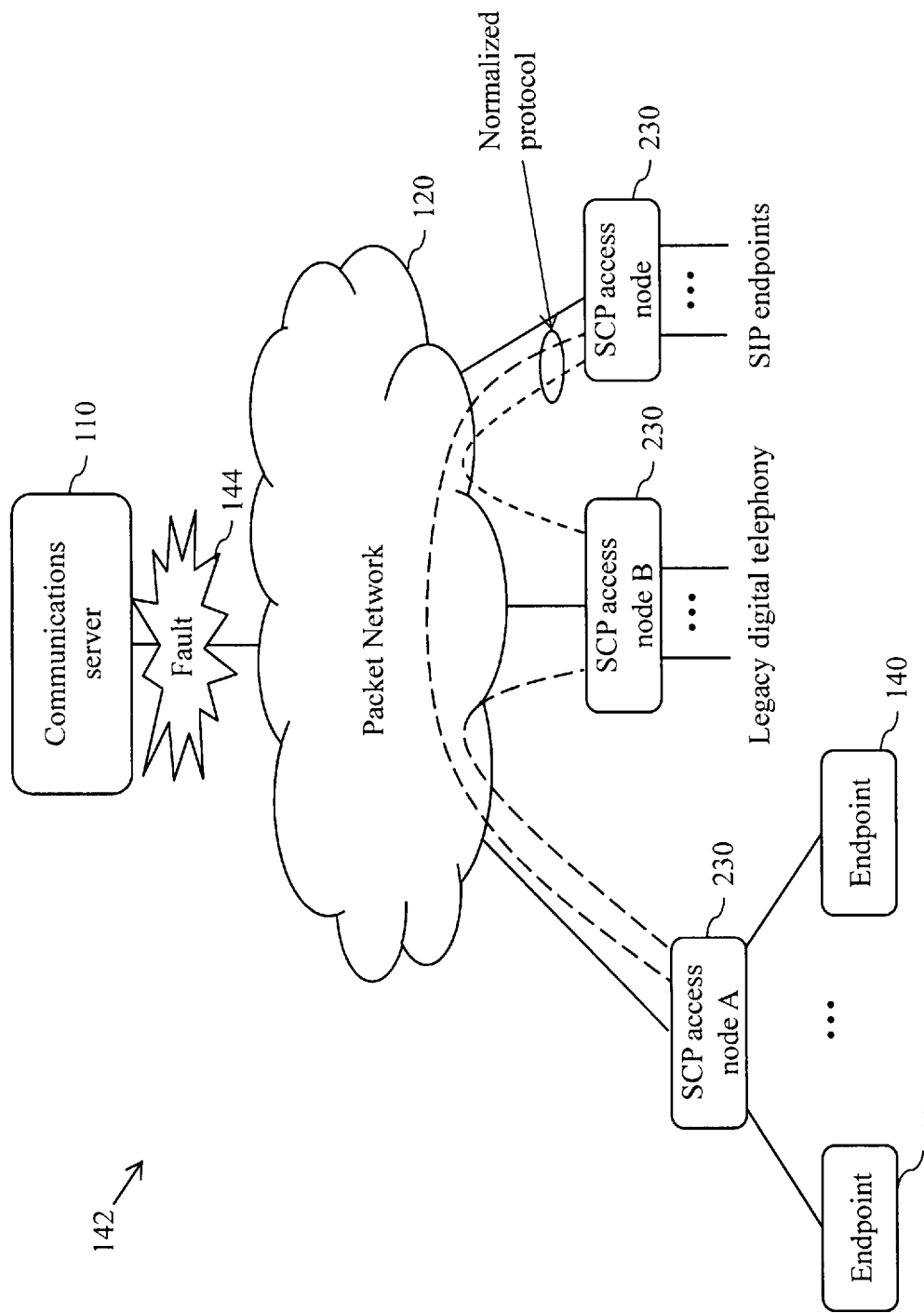
FIG. 2 illustrates a fault in an embodiment of an example network architecture.

FIG. 2 illustrates an embodiment of an example network architecture 142 in which the present approaches can be incorporated. The network architecture 142 is similar to the architecture 100 except that access nodes 130 are replaced by survivable communication proxy (SCP) access nodes 230. SCP access nodes 230 provide for regional survivable calling among disparate access technologies when a connection to the communication server 110 is lost as described more fully below. FIG. 2 also illustrates an example fault 144 in the architecture 142. The fault 144 is located such that communication between the SCP access nodes 230 and the communications server 110 is lost but the SCP access nodes 230 are able to be interconnected through the packet network 120.

Each of the SCP access nodes 230 has the capability to communicate with another SCP access node 230 to establish communications links between endpoints connected to those SCP access nodes 230. The SCP access nodes 230 can communicate with each other using a protocol, referred to herein as a normalized protocol. The normalized protocol is a protocol common to each of the SCP access nodes 230 regardless of the access technology used by an SCP access node 230 to communicate with the communications server 110. Each access node 230 therefore converts call data and control information from an endpoint to packets that are communicated using the normalized protocol. One such normalized protocol is the SIP protocol, in which case protocols used to communicate with endpoints are converted to SIP for communication with other SCP access nodes 230. In other words, peer SCP access nodes 230 use a normalized protocol to communicate with each other regardless of the types of access technologies used by the SCP access nodes 230.

Figure 3:
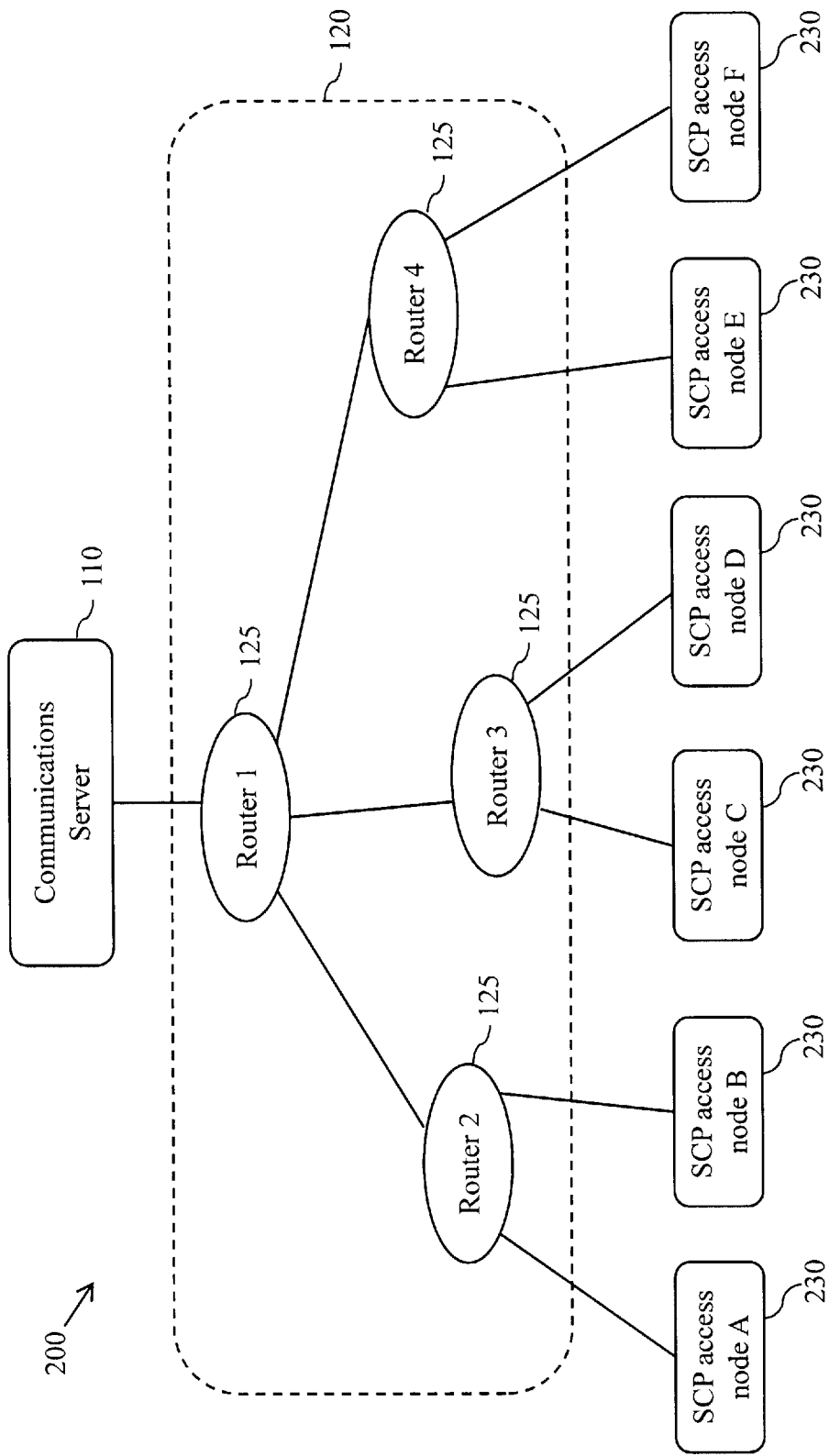
FIG. 3 illustrates another embodiment of an example network architecture.

FIG. 3 illustrates another embodiment of an example network architecture 200 in which the present approaches can be incorporated. In this example, there are six SCP access nodes, labeled as SCP access node A 230 through SCP access node F 230. As discussed previously, the SCP access nodes 230 are coupled to endpoints (not shown). In an embodiment, each of the SCP access nodes 230 can be coupled to endpoints using any access technology, which can result in a plurality of access technologies used among the group of SCP access nodes 230. Also, in this example, the packet network 120 comprises four routers—router 1 through router 4, each labeled 125—configured as shown. The routers 125 connect the SCP access nodes 230 to the communications server 110. In this embodiment, access node A 230 and access node B 230, as examples, connect to communications server 110 via router 1 125 and router 2 125. The numbers of routers 125 and SCP access nodes 230 are used for illustration, and the methodology presented herein applies to architectures that contain any number of routers and access nodes.

Figure 4:
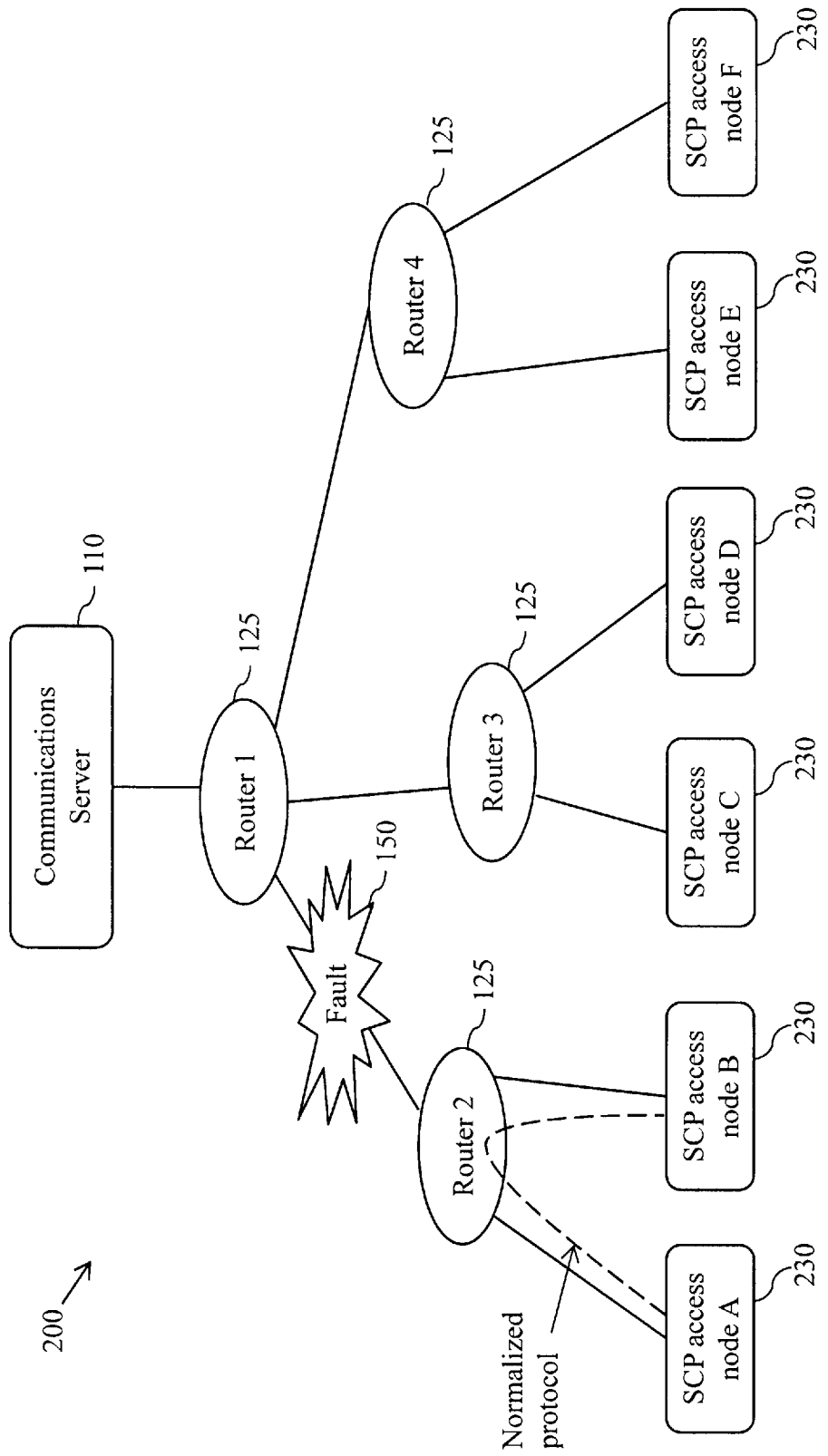
FIGS. 4 and 5 illustrate different faults in an embodiment of an example network architecture.

FIG. 4 illustrates an example where a fault 150 occurs in an embodiment of the example network architecture 200. The fault 150 is such that router 2 is disconnected from router 1 125 and therefore also disconnected from the communications server 110. In this example, the fault 150 could be due to a problem with a line connecting router 1 125 and router 2 125, due to a problem in router 1, or due to any other problem that renders communication between router 1 125 and router 2 125 inoperable. However, router 2 125, SCP access node A 230, and SCP access node B 230 are operational in this example.

Figure 6:
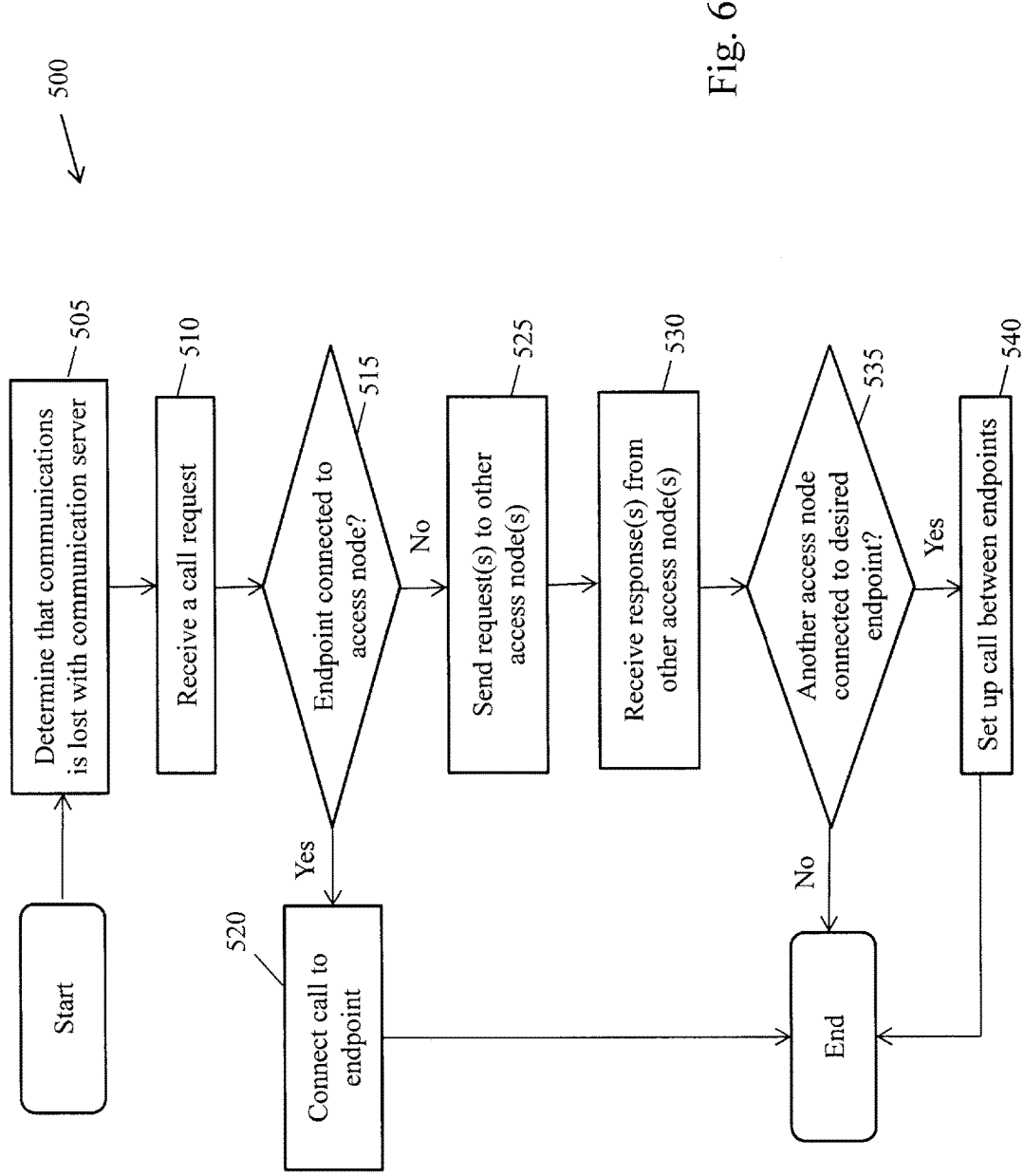
FIG. 6 illustrates an example method, adapted according to one embodiment.

In one embodiment, with reference to FIG. 4 and the example method 500 in FIG. 6, suppose for illustrative purposes that SCP access node A 230 is coupled to an endpoint that places a call, with the understanding that the method 500 applies to any SCP access node. The SCP access node A 230 can provide ESA service or regional survivable calling when communications is lost with the communications server 110 (due to fault 150) as follows. Suppose that an endpoint coupled to SCP access node A 230 desires to make a call to an endpoint identified by an endpoint identifier, such as an E.614 directory number or SIP URI. In action 505, SCP access node A 230 determines that communications with the communications server 110 is lost (e.g., the access node A 230 is disconnected from the communications server 110). In some embodiments, the determination is made based on the communications server 110 not responding to one or more control messages in some period of time. In some embodiments for example, the SCP access nodes 230, including SCP access node A 230, regularly communicate control messages with communications server 110. When the communications server 110 does not respond to one or more messages from SCP access node A 230, SCP access node A 230 determines that it is disconnected from the communications server 110. In other embodiments, SCP access node A 230 communicates control messages primarily when a call is placed by one of the endpoints connected to SCP access node A 230, in which case a determination is made during call setup (e.g., when the communications server 110 does not respond to the requested call).

In action 510, SCP access node A 230 receives a call request from an endpoint connected to it. In an example, the call request comprises an endpoint identifier (e.g., a ten-digit phone number or a SIP URI) that identifies another endpoint. In this example, each of the SCP access nodes 230 is responsible for a different subset of endpoint identifiers and corresponding endpoints, and each of the SCP access nodes 230 maintains a list or database of endpoint identifiers for which it is responsible. In some embodiments, the communication request is first validated depending on the interface that received the request and the protocol used to indicate the communications request. Because SCP access node A 230 knows (or discovers) that it is disconnected from the communication server 110, in action 515, SCP access node A 230 next determines whether the endpoint associated with the endpoint identifier is connected to the SCP access node A 230. In an example, SCP access node A 230 maintains a database of identifiers of endpoints connected to the SCP access node A 230. SCP access node A 230 performs a comparison of the desired identifier against the database to determine if the desired identifier is in the database. If the endpoint identifier is associated with SCP access node A 230, in action 520, SCP access node A 230 connects the call to the identified endpoint. In other words, if both the calling endpoint and the called endpoint are coupled to the access node A 230, then access node A 230 can connect a call between the two endpoints without involvement from the communications server 110. If the endpoint associated with the called endpoint identifier is not coupled to SCP access node A 230, the method 500 proceeds to action 525.

In action 525, SCP access node A 230 sends a request to each of the five SCP access nodes B 230 through F 230. In an embodiment, as part of an initial configuration, each of the access nodes A through F are preconfigured with the identity, such as the IP address, of each of the other five access nodes. Thus, SCP access node A 230 has an identifier of each of the other five SCP access nodes B 230 through F 230, so SCP access node A 230 has a way to direct communication to each of the other five SCP access nodes B 230 through F 230 (e.g., by using the IP addresses). However, any appropriate method for distributing or discovering addresses of access nodes can be used. For example, peer SCP access nodes 230 can be discovered by broadcasting a request message. Any peer SCP access node 230 that receives the request message can return a message that includes an identifier of the peer SCP access node 230. The request sent to each of the other access nodes comprises the desired/called endpoint identifier. A packet signaling protocol can be used to offer a communication session to one or more peer SCP access nodes 230.

In action 525, any other access node that is able to receive the request then determines whether the endpoint associated with the desired/called endpoint identifier is connected to the access node. In this example, based on the location of the fault 150 in FIG. 3, only SCP access node B 230 can receive its request from SCP access node A 230, and SCP access node A 230 cannot communicate with SCP access nodes C 230 through F 230. SCP access node B 230 then performs the same type of lookup performed by SCP access node A in action 515 to determine if the endpoint corresponding to the desired/called destination endpoint identifier is connected to SCP access node B 230. In addition, in some embodiments SCP access nodes 230 can maintain databases of endpoints connected to other SCP access nodes 230, in which case actions 525, 530, and 535 are condensed and a request is sent directly to the SCP access node responsible for the desired terminating endpoint.

In action 530, SCP access node A 230 receives a response from SCP access node B 230. The response indicates whether an endpoint associated with the desired/called endpoint identifier is connected to access node B 230. As an alternative, if an endpoint is not coupled to an SCP access node 230, the SCP access node 230 would not send a response, and a lack of response from an SCP access node 230 would be interpreted as an indication that the endpoint is not connected to the SCP access node 230.

In action 535, in SCP access node A 230, a determination is made whether another access node B-F 230 is connected to the desired/called endpoint. In this example, the determination is based on whether responses were received from other access nodes B-F 230 and whether the contents of a response indicate that another access node is coupled to the desired/called endpoint. In this example, if the response indicates that access node B 230 is connected to the desired/called endpoint, the method proceeds to action 540. In action 540 a call is setup between the calling endpoint at SCP access node A 230 and the receiving/called endpoint at SCP access node B 230. When SCP access node A 230 offers a communications session to peer survivable communications proxies 230, SCP access node A 230 maps communications requests from the protocol used by originating agent, which can be legacy telephony protocols or packet signaling protocols, into the normalized protocol used to communicate with peer SCP access nodes 230. If the response indicates that access node B 130 is not connected to the desired/called endpoint, the method 500 ends with no call being setup.

In the network architecture 200, the method 500 provides a way to establish a cluster comprising a plurality of SCP access nodes 230 to provide communication service to endpoints connected to the SCP access nodes 230 in the cluster. In the example discussed above with FIG. 3, access node A 230 and access node B 230 can form a cluster so that endpoints connected to access node A 230 can communicate with endpoints connected to access node B 230. In this example, clustering includes access node A 230 discovering that there is an available communication path with access node B and coordinating with access node B 230 to establish communication between an endpoint at access node A 230 and an endpoint at access node B 230, all without access to and use of the communications server 110.

Various embodiments may add, omit, rearrange, or modify the actions of method 500. For example, in an embodiment, action 505 may occur after a call request is received in action 510.

Figure 5:
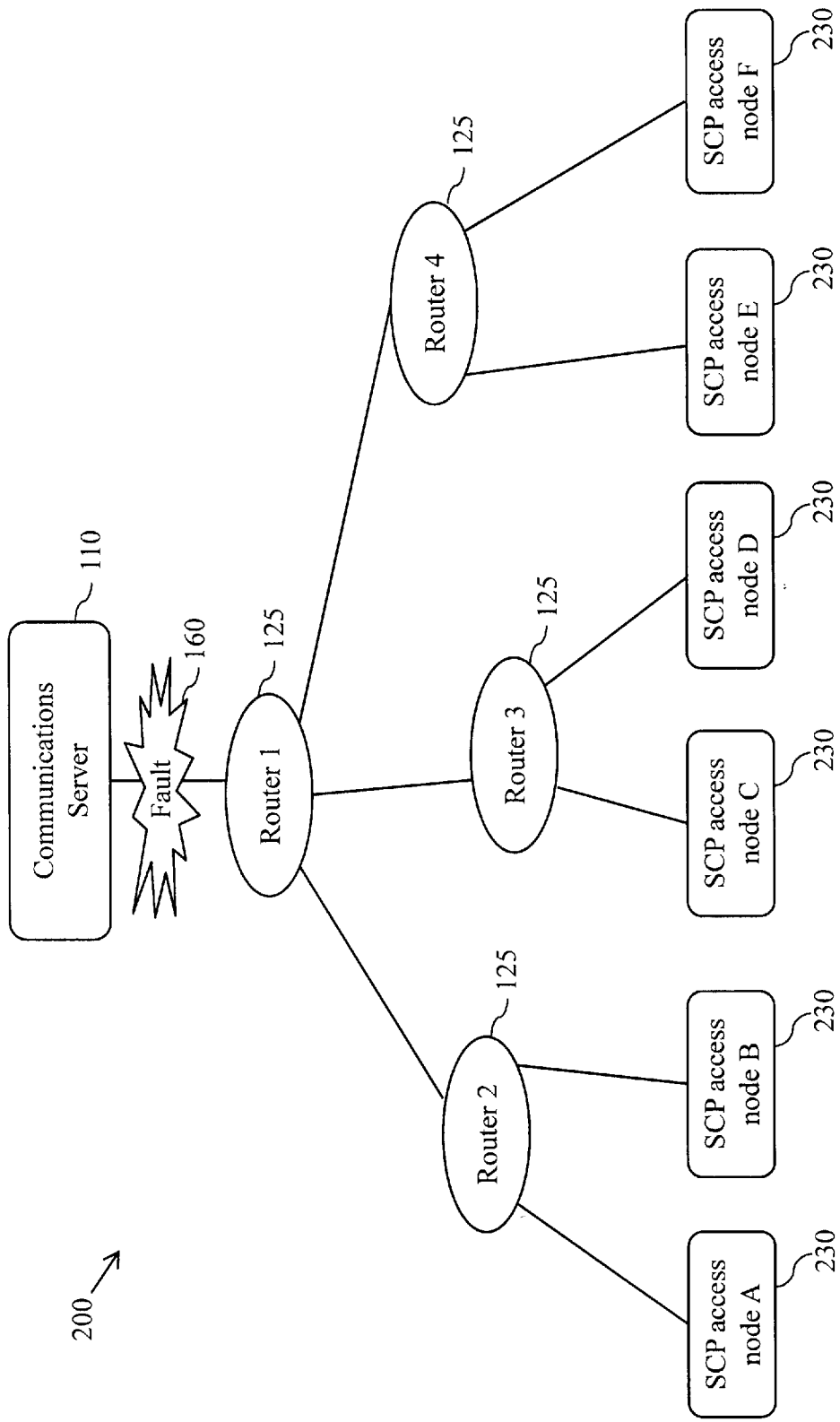

By way of further example, FIG. 5 illustrates a potential fault 160 in an embodiment of the example network architecture 200. The fault 160 is such that router 1 125 is disconnected from communications server 110. In this example, the fault 160 could be due to a problem with a line connecting router 1 125 and communications server 110, due to a problem in the communications server 110, or due to any other problem that renders communication between router 1 125 and communications server 110 inoperable. However, communications is operable between the routers 125 and access nodes 130 as shown.

In an embodiment, with reference to FIG. 5 and the example method 500 in FIG. 6, suppose for illustrative purposes that SCP access node A 230 is connected to an endpoint that places a call and that the destination of the call is not connected to SCP access node A 230. The process is similar to that described above with respect to FIG. 4, except that according to the embodiment of FIG. 5 SCP access node A 230 has the ability to communicate with more access nodes. Thus, some of the actions in FIG. 5 can have different results as described herein. In action 525, a request is sent to all other access nodes B 230 through F 230. All of these access nodes 230 receive the request because they are interconnected via routers 125. Each of the other access nodes 230 compares the requested/called endpoint identifier in the corresponding request against a database or list of identifiers for which the access node 230 is responsible. In action 530, SCP access node A 230 receives a response from each of the other access nodes. If one of the access nodes (e.g., access node F 230) is responsible for the requested/called endpoint, SCP access node A 230 will make this determination in action 535 and a call between the endpoint connected to SCP access node A 230 (the calling endpoint) and the desired/called endpoint (e.g., an endpoint at access node F 230) will be set up in action 540. In the example in FIG. 4, access nodes A 230 through F 230 can form a cluster so that endpoints connected to any access node 230 can communicate with endpoints connected to any other access node 230. In addition to interworking the signaling protocols used by the various SCP access nodes 230 to connect to endpoints (e.g., to connect an analog phone to a phone that uses VoIP), the SCP access nodes 230 can also interwork various endpoint identifiers (e.g., converting a telephone number to SIP URI).

The SCP access nodes 230 support a range of legacy and packet communications protocols and interwork call control requests from those interfaces to offer communication sessions to peer SCP access nodes 230. This includes legacy telecom signaling interfaces such as analog lines, GR-303, TR-008, legacy line frames, V5.2, primary rate interface (PRI), channel-associated signaling (CAS) and integrated services digital network (ISDN) user part (ISUP) trunks as well as packet signaling protocols such as NCS, MGCP, H.323, H.248, and SIP. In some embodiments, the telecom signaling interfaces and packet signaling protocols may collectively be referred to as access technologies or technologies used by endpoints and/or access nodes to access an interconnection network among endpoints. The SCP access nodes 230 can communicate using secured or non-secured communications.

Figure 7:
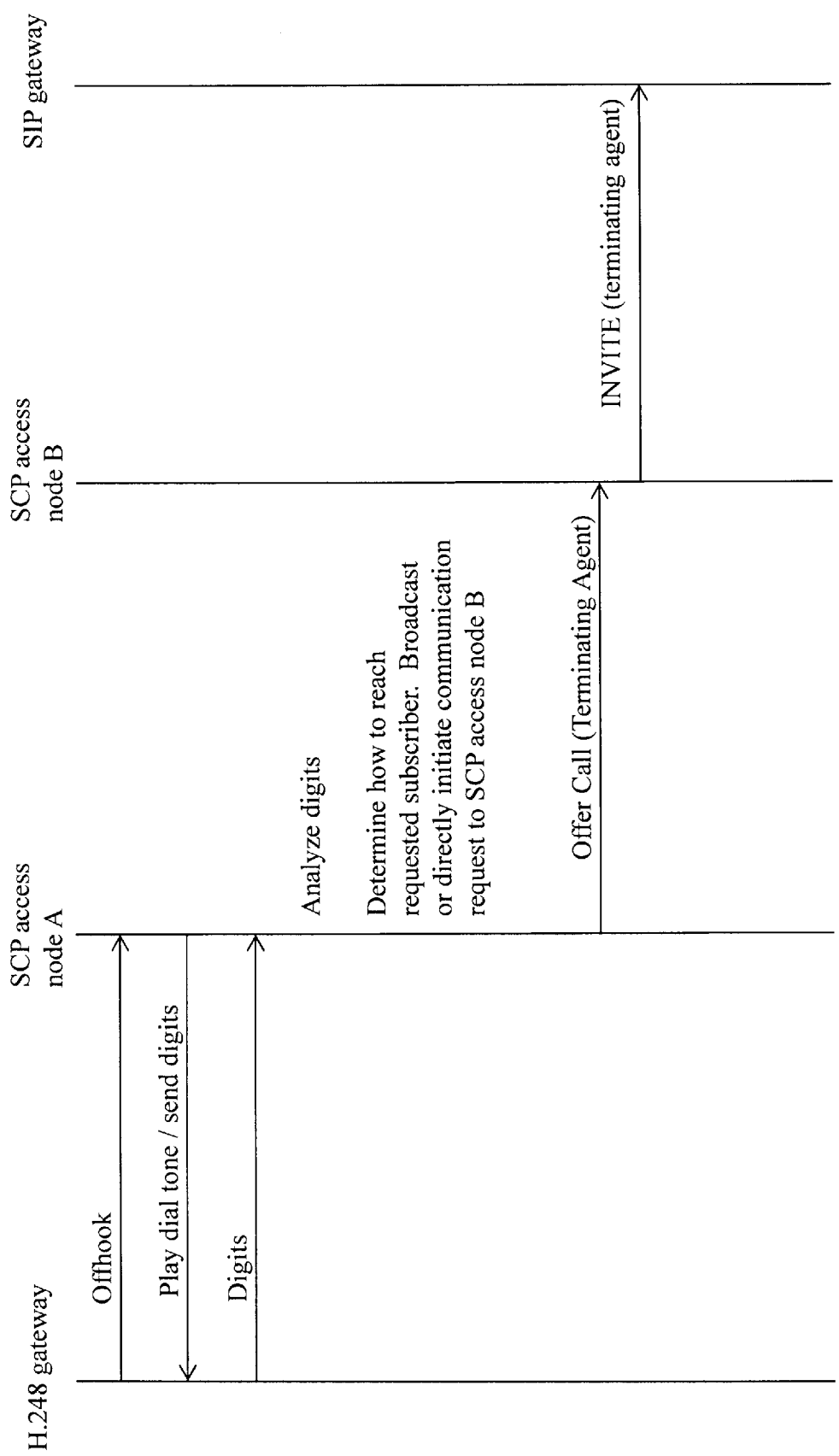
FIG. 7 illustrates an embodiment of an example call flow.

As yet another example in which SCP access nodes 230 support disparate access technologies and protocols, FIG. 7 illustrates an example call flow between an H.248 gateway and a SIP gateway via intermediate SCP access nodes 230.

Figure 8:
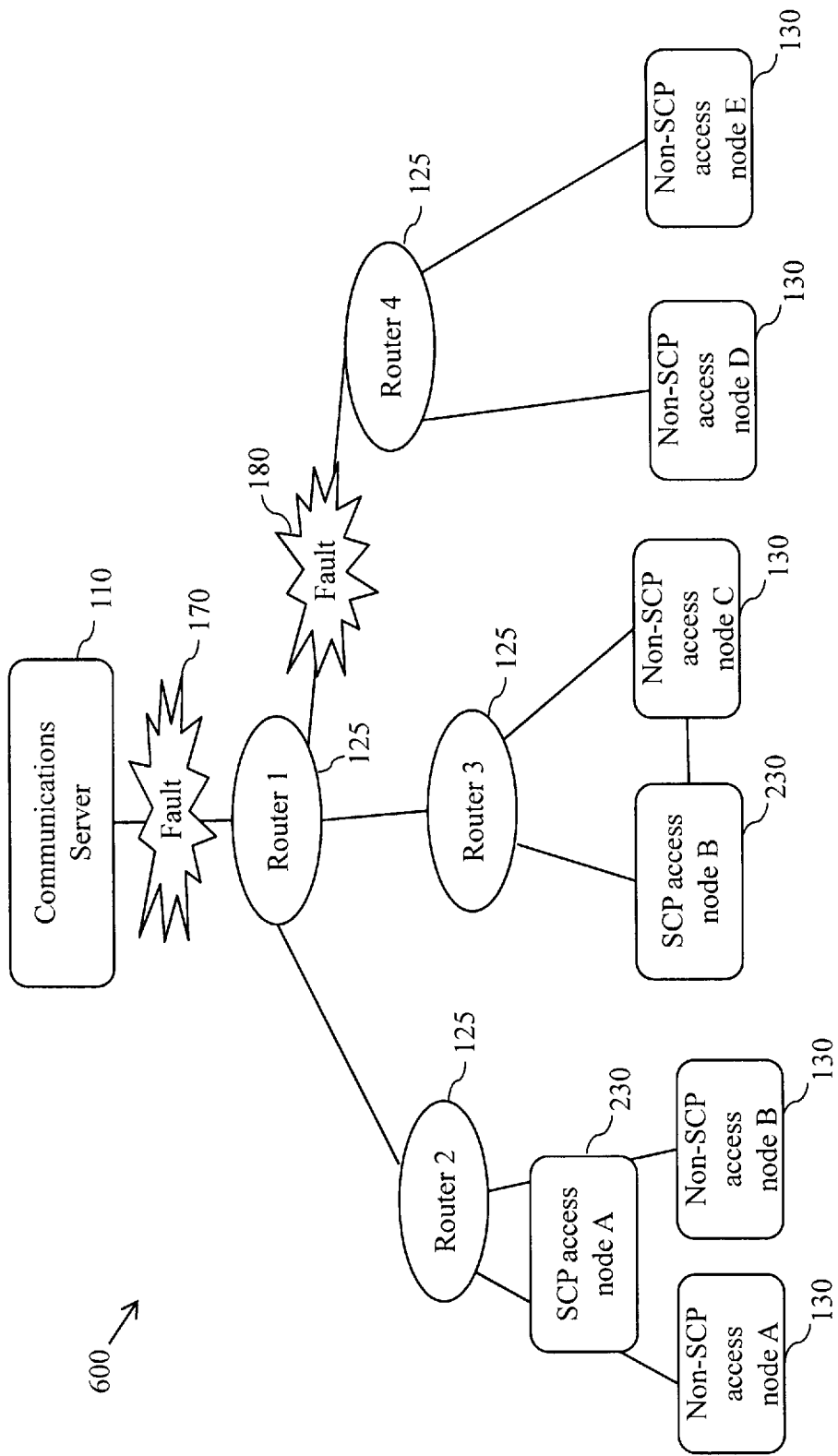
FIG. 8 illustrates an embodiment of an example network architecture and possible faults in the embodiment.

FIG. 8 illustrates example faults 170 and 180 in an embodiment of the example network architecture 600. For simplicity of illustration, both faults are shown as occurring at the same time, but it is more likely the case that only one fault 170 or the other fault 180 exists at any given time. The network architecture 600 includes a mix of SCP 230 and non-SCP access nodes 130. The non-SCP access nodes 130 are so named because these access nodes lack the ability to communicate directly with another non-SCP access node 130 without an intermediate SCP access node 230 to act as a translator, unless the peer non-SCP access node 130 uses the same upstream access technology (e.g., peer non-SCP access nodes 130 use SIP on the upstream) as well as the same downstream access technology. The non-SCP access nodes 130 lack the ability to convert protocols used to communicate with endpoints to a normalized protocol. Thus, non-SCP access nodes 130 can be merely conventional access nodes that have the capability to form a cluster only with other non-SCP access nodes 130 with endpoints that use the same access technology. The architecture 600 is used as an illustrative example and in practice the techniques described herein apply to a network comprising any number of non-SCP access nodes 130 and SCP access nodes 230 in any topology.

Assuming fault 180 does not exist at the same time, the fault 170 is such that all access nodes 130 and 230 are disconnected from communications server 110. However, in this example, the access nodes 130 and 230 can communicate with each other via routers 125.

Figure 9:
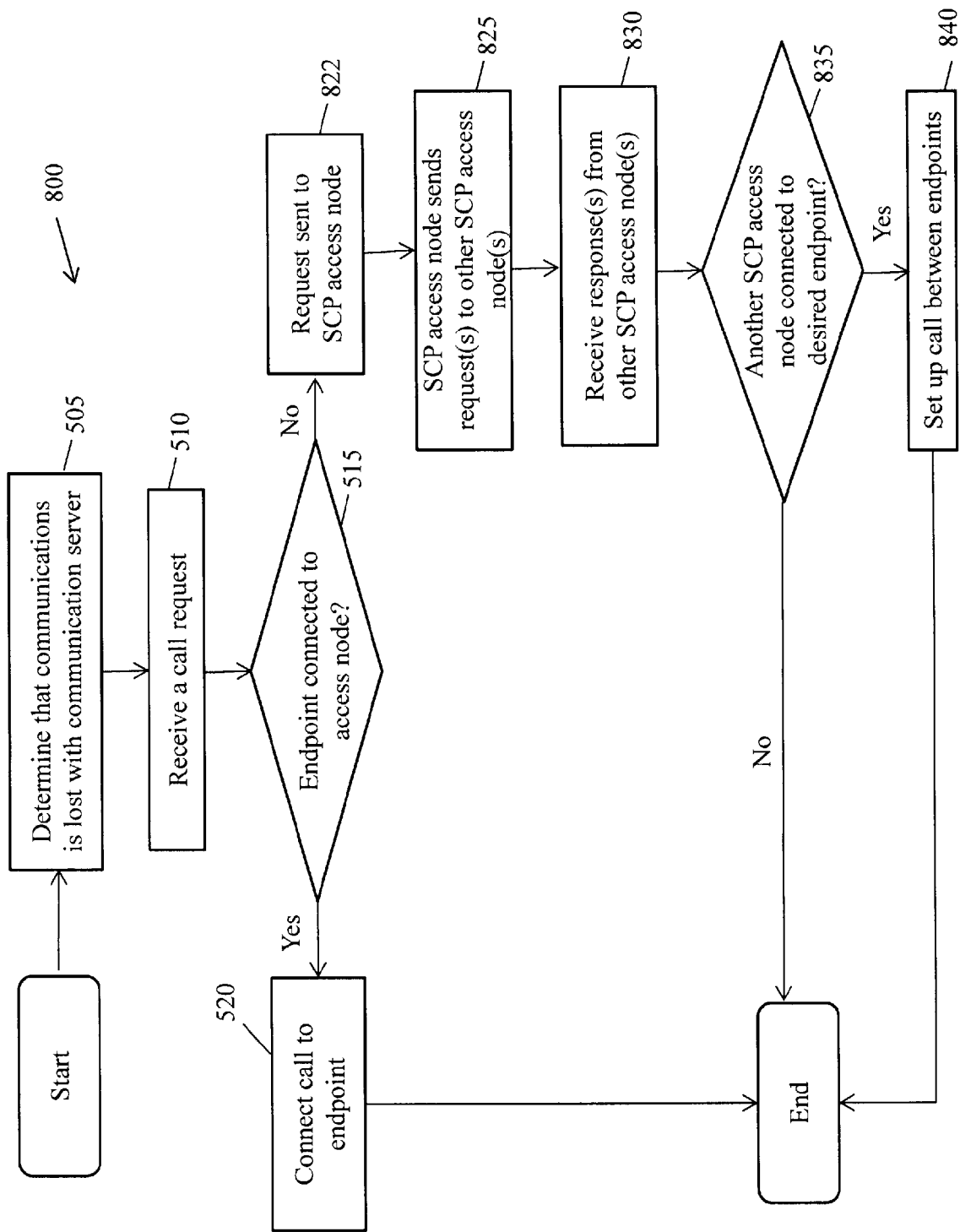
FIG. 9 illustrates an example method, adapted according to one embodiment.

In an embodiment, with reference to FIG. 8 and the example method 800 in FIG. 9, suppose for illustrative purposes that non-SCP access node A 130 is connected to an endpoint that places a call. In an example, the call request comprises an endpoint identifier (e.g., a ten-digit phone number or a SIP URI) that identifies another endpoint. Actions 505-520 were described previously and are not described again here in the interest of conciseness. If the endpoint associated with the endpoint identifier is not connected to access node A, the method 500 proceeds to action 822.

In action 822, non-SCP access node A 130 sends a request to the nearest SCP access node 230, if one is available, which is SCP access node A 230 in this case. A non-SCP access node can be provisioned with the address of the nearest SCP access node, or a non-SCP access node can use a discovery mechanism, such as broadcast messages, to discover the nearest SCP access node. The request comprises the desired endpoint identifier. The SCP access node A 230 can also communicate with non-SCP access node B 130 to determine if endpoint with the desired endpoint identifier is connected to it. In action 825, SCP access node A 230 sends the request to each of the other SCP access nodes 230 (i.e., in this example, SCP access node B 230). Each of the other SCP access nodes 230 then performs the same type of lookup performed by access node A in action 515 to determine if the endpoint identifier is connected to it. In an embodiment, the SCP access node A 230 is preconfigured with the addresses of the other SCP access nodes 230, discovers the addresses through a network discovery mechanism, or obtains the addresses in any other appropriate manner.

In action 830 SCP access node A 230 receives a response from the SCP access node B 230. The response indicates whether an endpoint associated with the desired endpoint identifier is connected to SCP access node B 230. As an alternative, if an endpoint is not connected with an access node 230, the access node would not send a response, and a lack of response from an access node 230 is interpreted as an indication that the endpoint is not connected to the access node 230.

In action 835, the same determination as performed in action 535 is performed, except that the determination is performed in SCP access node A 230. The determination is based on whether responses were received from access nodes 230 and whether the contents of a response indicate that another access node is connected to the desired endpoint. In this example, if the response indicates that an access node 230 is connected to the desired endpoint, either directly or through a non-SCP access node 130, the method proceeds to action 840. In action 840 a cell is setup between the calling endpoint at non-SCP access node A 130 and the receiving endpoint at the indicated access node 130 or 230. The call is setup via at least one SCP access node 230 and possibly non-SCP access nodes 130. If the response(s) indicate that no access node 130 or 230 is connected to the desired endpoint, the method 800 ends with no call being setup. In an example, action 840 includes sending a message to non-SCP access node A 130 that indicates that the SCP access node A 230 can connect to the endpoint corresponding to the desired endpoint identifier.

Assuming fault 170 does not exist at the same time, the fault 180 is such that non-SCP access nodes D and E 130 are disconnected from communications server 110. In this scenario, non-SCP access nodes D and E 130 can coordinate to connect endpoints provided that endpoints connected to these access nodes 130 use the same access technology. If endpoints connected to non-SCP access nodes D and E 130 use different access technology (e.g., endpoints connected to non-SCP access node D 130 use analog telephony, and endpoints connected to non-SCP access node E 130 use packet telephony) then non-SCP access nodes D and E 130 cannot communicate with each other to form a regional survivable calling network. On the other hand, if endpoints connected to non-SCP access nodes D and E 130 use the same access technology, then non-SCP access nodes D and E 130 can communicate with each other to form a regional survivable calling network using, for example, the method 500 described previously.

During normal operations (i.e., when there are no faults, such as faults 170 or 180), SCP access nodes, such as SCP access nodes 230, can be configured as transparent proxies that allow communications from non-SCP access nodes 130 as shown in FIG. 7 to pass through the proxies during normal operations. For example, during normal operations, SCP access node A 230 can be configured to allow communications from non-SCP access nodes A and B 130 to pass through the proxies during normal operations.

An SCP access node 230 has the capability to provide local call connectivity between non-SCP access nodes 130 connected to it. For example, suppose a fault (not shown) exists between router 1 125 and router 2 125. In this scenario, SCP access node A 230 can provide call connectivity between non-SCP access node A 130 and non-SCP access node B 130, regardless of the access technologies utilized by these access nodes. In this scenario, SCP access node A translates between the protocols used by non-SCP access nodes A and B 130. Using the methods described herein, SCP access node 230 can coordinate communication between endpoints of non-SCP access nodes A and B 130.

Figure 10:
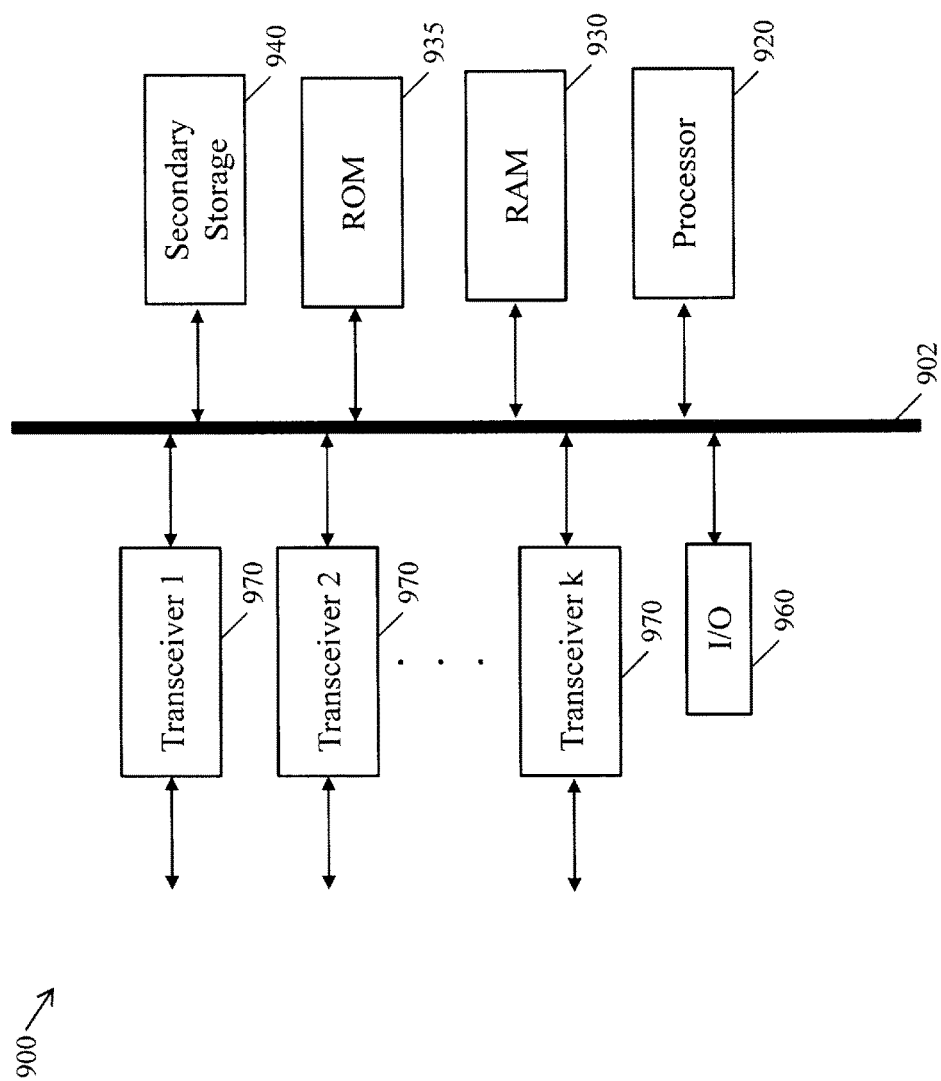
FIG. 10 illustrates an example computer system, adapted according to one embodiment.

FIG. 10 illustrates an example computer system 900 adapted according to one embodiment of the present disclosure. The computer system 900 comprises an example system on which embodiments of the present disclosure may be implemented (such as an SCP access node or a non-SCP access node). The computer system 900 comprises a processor 920, a random access memory (RAM) 930, a read-only memory (ROM) 935, secondary storage 940, input/output (I/O) devices 960, and a plurality of transceivers 970, all of which may be communicatively coupled via a bus 902. The processor 920 may be implemented using hardware or a combination of hardware and software. Although illustrated as a single processor, the processor 920 is not so limited and may comprise multiple processors. The processor 920 may be implemented as one or more processors, e.g., as one or more central processing unit (CPU) chips, cores (e.g., a multi-core processor), field-programmable gate arrays (FPGAs), and/or application specific integrated circuits (ASICs).

The secondary storage 940 may comprise one or more disk drives or tape drives and is used for non-volatile storage of data and as an over-flow data storage device if the RAM 930 is not large enough to hold all working data. The RAM 930 may be static RAM, dynamic RAM, or the like, and the ROM 435 may be programmable ROM (PROM), erasable PROM (EPROM), electrically EPROM (EEPROM), or the like. The secondary storage 940 may be used to store programs that are loaded into the RAM 930 when such programs are selected for execution. The ROM 935 is used to store instructions and perhaps data that are read during program execution. The ROM 935 is a non-volatile memory device that typically has a small memory capacity relative to the larger memory capacity of the secondary storage. The RAM 930 is used to store volatile data and perhaps to store instructions. Access to both the ROM 935 and the RAM 930 is typically faster than to the secondary storage 940.

In an embodiment, the computer system 900 includes a plurality of transceivers, labeled as transceiver 1 970 through transceiver k 970, where k is an integer greater than one. There may be a transceiver 970 for each communication line (e.g., electrical or optical) coupled to the computer system 970. A transceiver 970 may be bidirectional or unidirectional, depending on the embodiment. Each transceiver 970 is adapted to couple computer system 900 to a communication link (e.g., a wired or wireless communication link). The computer system 900 may be coupled to only one communications link, in which case there is only one transceiver 970. If the computer system 900 is an access node, in one embodiment, one of the transceivers 970 connects the computer system 900 to at least one endpoint and another one of the transceivers 970 connects the computer system 900 to a router. Thus, in an embodiment the computer system 900 includes communication circuitry comprising one or more transceivers 970.

The I/O devices 960 may include a keyboard, a computer mouse, a microphone, and/or a display device for allowing a user to provide input to and receive output from the computer system 900.

It is understood that by programming and/or loading executable instructions onto the computer system 900, at least one of the processor 920, the RAM 930, and/or the secondary storage 940 are changed, transforming the computer system 900 in part into a particular machine or apparatus (e.g., an SCP access node 230) having the functionality taught by the present disclosure. The executable instructions may be stored on the RAM 930 or secondary storage 440 and loaded into the processor 920 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hard-wires the instructions of the software. In the same manner, as a machine controlled by a new ASIC is a particular machine or apparatus, likewise a computer that has been programmed and/or loaded with executable instructions may be viewed as a particular machine or apparatus.

Logic may be encoded in a non-transitory computer-readable medium, such as RAM 930 and/or secondary storage 940. Such a medium can take many forms, including but not limited to, non-volatile media and volatile media. In various implementations, non-volatile media includes optical or magnetic disks, such as secondary storage 940, and volatile media includes dynamic memory, such as various types of RAM 930. Processor 920 reads application code from the readable medium and executes the code to provide the described functionality.

Embodiments disclosed herein provide distinct advantages over conventional systems. A regional multi-access-node survivable calling community can be established comprising a plurality of access nodes that include gateways and/or proxies. The regional calling community allows multiple access nodes to communicate and cooperate when there is a loss of service from a primary communications platform having a communications server, such as a call server, an application server, an IMS solution, and/or a softswitch. The access nodes can coordinate to provide communications service between endpoints connected to different access nodes. In contrast, some conventional solutions provide connectivity only at the level of a single access node, thus communications is limited to taking place between endpoints connected to the same access node.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of providing survivable communications in a communications network, the method comprising:
    determining a loss of communications between a first access node and a communications server, wherein the communications server provides call connectivity to a first endpoint coupled to the first access node using a first network access technology, the first access node configured to be directly connected to endpoints; and
    in response to determining the loss of communications with the communications server, establishing a connection between the first access node and a second access node that provides communication services to a second endpoint, the second access node configured to be directly connected to endpoints, wherein the second access node is coupled to the second endpoint using a second network access technology different from the first network access technology, and wherein communication service is provided between the first endpoint and the second endpoint via the first access node using the first network access technology and via the second access node using the second network access technology, wherein the first access node and the second access node are configured to convert call data and control information into a protocol that is common to both the first and second access nodes and communicate with each other using the protocol.

2. The method of claim 1, wherein forming a cluster comprises:
    receiving a call request from the endpoint, wherein the call request comprises an identifier of the second endpoint;
    determining that the second endpoint is connected to the second access node; and
    setting up a call between the endpoint and the second endpoint via the access node.

3. The method of claim 2, further comprising:
    prior to determining that the second endpoint is connected to the second access node, determining that the second endpoint is not connected to the access node.

4. The method of claim 3, wherein forming a cluster further comprises:
    sending the call request to the second access node; and
    receiving a response from the second access node, wherein the response indicates that the second endpoint is connected to the second access node.

5. A system comprising:
    a first access node configured to couple to a first endpoint and a communications server, the first access node configured to be directly connected to endpoints, the first access node comprising:
        a communication circuitry configured to:
            receive a call request from the first endpoint, wherein the call request comprises an identifier of a second endpoint connected to a second access node, the second access node configured to be directly connected to endpoints; and
            transmit a control message to a communications server, wherein the communications server is configured to provide calling features to the first endpoint; and
        a processor configured to:
            determine that the first access node is disconnected from the communications server;
            determine that the second endpoint is not connected to the first access node; and
            in response to determining that the first access node is disconnected from the communication server and determining that the second endpoint is not connected to the first access node, instruct the communication circuitry to contact the second access node, wherein the first endpoint uses a first network access technology, wherein the second endpoint uses a second network access technology different than the first access technology, wherein the communication circuitry is further configured to receive a response from the second access node, wherein the response indicates that the second endpoint is coupled to the second access node, and wherein the processor is further configured to set up a call between the endpoint and the second endpoint via the first access node using the first network access technology and via the second access node using the second network access technology, wherein the first access node and the second access node use a protocol that is common to both the first and second access nodes and the first access node is configured to convert call data and control information from the first endpoint to packets that are communicated using the protocol.

6. The system of claim 5, wherein the access node communicates with the endpoint using analog plain-old telephone service (POTS), and wherein the second access node communicates with the second endpoint using session initiation protocol (SIP).

7. The system of claim 5, wherein the endpoint is an analog or time division multiplex (TDM) telephone, and wherein the second endpoint is a session initiated protocol (SIP) device.

8. A computer program product having a non-transitory computer readable medium tangibly recording computer program logic for establishing a call between endpoints coupled to different access nodes when the access nodes lose communication with a session and services control layer, the computer program product comprising:
    code to determine that a first access node is disconnected from the session and services control layer, wherein the session and services control layer provides calling features to a first endpoint coupled to the first access node, the first access node configured to be directly connected to endpoints; and
    code to provide communication service between the first endpoint and a second endpoint connected to a second access node after the first access node is disconnected from the session and services control layer, the second access node configured to be directly connected to endpoints, wherein the first access node is coupled to the first endpoint using a first network access technology, wherein the second access node is coupled to the second endpoint using a second network access technology different than the first network access technology, and wherein communication service is provided between the endpoint and the second endpoint via the first access node using the first network access technology and via the second access node using the second network access technology, wherein the first access node and the second access node use a protocol that is common to both the first and second access nodes and the first access node is configured to convert call data and control information from the first endpoint to packets that are communicated using the protocol.

9. The computer program product of claim 8, wherein the code to provide communication service comprises:
   code to receive a call request from the endpoint, wherein the call request comprises an identifier of the second endpoint;
   code to determine that the second endpoint is coupled to the second access node; and
   code to set up a call between the endpoint and the second endpoint.

10. The computer program product of claim 9, wherein the code to determine that the second endpoint is connected to the second access node further comprises:
   code to send a second call request corresponding to the call request to the second access node; and
   code to receive a response from the second access node, wherein the response indicates that the second endpoint is connected to the second access node.

11. The computer program product of claim 9, wherein the endpoint is an analog or time division multiplex (TDM) telephone, and wherein the second endpoint is a session initiated protocol (SIP) device.

12. The computer program product of claim 9, wherein the identifier of the second endpoint is a ten-digit telephone number, wherein an identifier of the endpoint is a session initiation protocol (SIP) uniform resource identifier (URI), and wherein the communication service is a voice communication service.

13. The computer program product of claim 10, wherein the access node provides call connectivity to endpoints using any one of the signaling interfaces: analog lines, GR-303, TR-008, legacy line frames, V5.2, primary rate interface (PRI), channel-associated signaling (CAS), or integrated services digital network (ISDN) user part (ISUP), or any one of packet signaling protocols such as network-based call signaling (NCS), media gateway control protocol (MGCP), H.323, gateway control protocol (H.248), or session initiation protocol (SIP), and wherein the second access node provides calling features to endpoints using any one of these signaling interfaces or packet signaling protocols different than the access node.

\* \* \* \* \*